United States Patent
Lee et al.

(10) Patent No.: US 9,520,099 B2
(45) Date of Patent: Dec. 13, 2016

(54) CONVERTER AND DISPLAY APPARATUS HAVING THE SAME

(71) Applicant: Samsung Display Co., LTD., Yongin, Gyeonggi-Do (KR)

(72) Inventors: Bum Lee, Cheonan-si (KR); Dong-In Kim, Suwon-si (KR); Yeon-Sun Na, Yongin-si (KR); Hyun-Seok Hong, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 175 days.

(21) Appl. No.: 14/572,682

(22) Filed: Dec. 16, 2014

(65) Prior Publication Data

US 2015/0170601 A1 Jun. 18, 2015

(30) Foreign Application Priority Data

Dec. 17, 2013 (KR) .......................... 10-2013-0157095

(51) Int. Cl.
*H02M 3/156* (2006.01)
*G09G 3/36* (2006.01)
*H02M 1/00* (2006.01)

(52) U.S. Cl.
CPC .......... *G09G 3/3696* (2013.01); *H02M 3/156* (2013.01); *G09G 3/3611* (2013.01); *G09G 2330/02* (2013.01); *H02M 2001/0032* (2013.01); *H02M 2001/0048* (2013.01); *Y02B 70/1491* (2013.01); *Y02B 70/16* (2013.01)

(58) Field of Classification Search
CPC .................................................... H02M 3/156
See application file for complete search history.

(56) References Cited

U.S. PATENT DOCUMENTS

| | | | |
|---|---|---|---|
| 5,572,330 A * | 11/1996 | Sasanuma | H04N 1/6033 347/133 |
| 8,358,118 B2 | 1/2013 | Chen et al. | |
| 9,182,708 B2 * | 11/2015 | Mukaibara | G03G 15/1645 |
| 2008/0309622 A1 * | 12/2008 | Krah | G06F 3/0418 345/173 |
| 2011/0133714 A1 | 6/2011 | Chen et al. | |
| 2011/0255319 A1 | 10/2011 | Ayukawa et al. | |
| 2012/0098515 A1 | 4/2012 | Yamaguchi et al. | |
| 2012/0119720 A1 | 5/2012 | Li | |
| 2013/0151872 A1 | 6/2013 | Liou et al. | |

FOREIGN PATENT DOCUMENTS

KR 10-2008-0068162 A 7/2008

\* cited by examiner

*Primary Examiner* — Emily P Pham
(74) *Attorney, Agent, or Firm* — Innovation Counsel LLP (57) ABSTRACT

A converter includes a feedback part, a pulse width modulation (PWM) controller and a PWM generator. The feedback part is configured to output a feedback signal based on a driving voltage. The PWM controller is configured to output a PWM control signal based on the feedback signal and a first compensation signal. The PWM generator is configured to control the driving voltage based on the PWM control signal. The first compensation signal is determined according to an occurrence of a predetermined pattern of an input image data.

20 Claims, 3 Drawing Sheets

CONVERTER AND DISPLAY APPARATUS HAVING THE SAME

This application claims priority to Korean Patent Application No. 10-2013-0157095, filed on Dec. 17, 2013, and all the benefits accruing therefrom under 35 U.S.C. §119, the contents of which are herein incorporated by reference in their entireties.

BACKGROUND

1. Field

Exemplary embodiments of the inventive concept relate generally to a DC-DC converter and a display apparatus having the DC-DC converter. More particularly, exemplary embodiments of the inventive concept relate to a DC-DC converter capable of controlling a waveform of a pulse-width modulation signal in accordance with a pattern of an image and a temperature of a display apparatus, as well as a display apparatus having the DC-DC converter.

2. Description of the Related Art

Generally, it is desirable to provide a liquid crystal display apparatus with a relatively small thickness, a relatively light weight and a relatively low power consumption so that the liquid crystal display apparatus can be used for mobile and other applications such as for a monitor, a laptop computer, a cellular phone, a television and so on. The liquid crystal display ("LCD") apparatus includes a liquid crystal display panel configured for displaying an image using a light transmittance characteristic of a liquid crystal, and a light source apparatus. The light source apparatus provides light to the liquid crystal display panel and uses a boost converter known to be relatively stable and having a relatively high efficiency, to generate driving voltages for driving the liquid crystal display panel and the light source. The boost converter boosts the voltages for driving the liquid crystal display panel and the light source.

The boost converter may transfer information about various conditions using pulse-width modulation ("PWM"). For example, a width of a PWM signal may describe the level of voltage, a period of the PWM signal may indicate a power consumption, efficiency and compensation response time, and a slew rate of the PWM signal may indicate a power consumption and efficiency.

A conventional PWM implementation has a fixed value from a product development step onward. Thus, the PWM may not respond to a change of a particular pattern of the image, a change of a temperature and a change of a current.

SUMMARY

One or more exemplary embodiments of the inventive concept provide a converter capable of changing an output voltage of the converter in response to a particular pattern of an image, a change in a temperature and/or a change in a current.

One or more exemplary embodiments of the inventive concept also provide a display apparatus having the converter.

According to an exemplary embodiment, a converter includes a feedback part, a pulse width modulation (PWM) controller and a PWM generator. The feedback part is configured to output a feedback signal based on a driving voltage. The PWM controller is configured to output a PWM control signal based on the feedback signal and a first compensation signal. The first compensating signal is determined according to an occurrence of a predetermined pattern of an input image data. The PWM generator is configured to control the driving voltage based on the PWM control signal.

In an exemplary embodiment, the PWM controller may be configured to output the PWM control signal based on the feedback signal, the first compensation signal and a second compensation signal, and the second compensation signal may be determined according to a temperature of a driving part.

In an exemplary embodiment, the PWM controller may be configured to output the PWM control signal based on the feedback signal, the first compensation signal and a second compensation signal, and the second compensation signal may be determined according to a temperature of a display panel.

In an exemplary embodiment, the converter may further include an input terminal, an output terminal, an inductor, a switching element and a diode. The input terminal may be configured to receive an input voltage. The output terminal may be configured to output the driving voltage. A first end of the inductor may be electrically connected to the input terminal and the inductor may be configured to charge the input voltage. A gate electrode of the switching element may be connected to the PWM generator. A source electrode of the switching element may be connected to a ground. A drain electrode of the switching element may be connected to a second end of the inductor. An anode of the diode may be connected to the second end of the inductor and the drain electrode of the switching element. A cathode of the diode may be connected to the output terminal.

In an exemplary embodiment, the converter may further include a first resistor connected to the output terminal and a second resistor connected to the first resistor in series. The feedback part may be configured to output the feedback signal based on a voltage applied between the first resistor and the second resistor.

In an exemplary embodiment, the converter may further include a current detector connected to the drain electrode of the switching element. The current detector may be configured to detect a current applied to the drain electrode of the switching element, and to output a third compensation signal based on the current applied to the drain electrode. The PWM controller may be configured to output the PWM control signal based on the feedback signal, the first compensation signal and the third compensation signal.

According to an exemplary embodiment, a display apparatus includes a display panel, a driving part, an image pattern detector and a converter. The display panel is configured to display an image. A driving part is configured to drive the display panel. An image pattern detector is configured to output a first compensation signal based on an input image data. The converter is configured to output a driving voltage to the driving part. The converter includes a feedback part, a pulse width modulation (PWM) controller and a PWM generator. The feedback part is configured to output a feedback signal based on the driving voltage. The PWM controller is configured to output a PWM control signal based on the feedback signal and a first compensation signal. The first compensating signal can be determined according to an occurrence of a predetermined pattern of an input image data. The PWM generator is configured to control the driving voltage based on the PWM control signal.

In an exemplary embodiment, the display apparatus may further include a temperature detector configured to output a second compensation signal based on a temperature of the driving part. The PWM controller may be configured to output the PWM control signal based on the feedback signal, the first compensation signal and the second compensation signal.

In an exemplary embodiment, the driving part may include a gate driver configured to output a gate signal to a gate line of the display panel. The temperature detector may be configured to output the second compensation signal based on a temperature of the gate driver.

In an exemplary embodiment, the driving part may include a data driver configured to output a data voltage to a data line of the display panel. The temperature detector may be configured to output the second compensation signal based on a temperature of the data driver.

In an exemplary embodiment, the temperature detector may include one of a negative temperature coefficient ("NTC") thermistor, a positive temperature coefficient ("PTC") thermistor, a critical temperature resistor ("CTR") and a Seebeck element. A resistance of the negative temperature coefficient ("NTC") thermistor may decrease when the ambient temperature increases. A resistance of the positive temperature coefficient ("PTC") thermistor may increase when the ambient temperature increases. A resistance of the critical temperature resistor ("CTR") may significantly change at approximately a preset temperature. The Seebeck element may generate an electromotive force according to a temperature difference.

In an exemplary embodiment, the display apparatus may further include a temperature detector configured to output a second compensation signal based on a temperature of the display panel. The PWM controller may be configured to output the PWM control signal based on the feedback signal, the first compensation signal and the second compensation signal.

In an exemplary embodiment, the converter may further include an input terminal, an output terminal, an inductor, a switching element and a diode. The input terminal may be configured to receive an input voltage. The output terminal may be configured to output the driving voltage. A first end of the inductor may be electrically connected to the input terminal and the inductor may be configured to charge the input voltage. A gate electrode of the switching element may be connected to the PWM generator. A source electrode of the switching element may be connected to a ground, and a drain electrode of the switching element may be connected to a second end of the inductor. An anode of the diode may be connected to the second end of the inductor and the drain electrode of the switching element, and a cathode of the diode may be connected to the output terminal.

In an exemplary embodiment, the converter may further include a current detector connected to the drain electrode of the switching element. The current detector may be configured to detect a current applied to the drain electrode of the switching element, and to output a third compensation signal based on the current applied to the drain electrode. The PWM controller may be configured to output the PWM control signal based on the feedback signal, the first compensation signal and the third compensation signal.

In an exemplary embodiment, the converter may further include a first resistor connected to the output terminal and a second resistor connected to the first resistor in series. The feedback part may be configured to output the feedback signal based on a voltage applied between the first resistor and the second resistor.

In an exemplary embodiment, the PWM controller may include a look-up table having values corresponding to the PWM control signal. The PWM controller may be configured to generate the PWM control signal according to the stored values of the look-up table.

In an exemplary embodiment, the PWM controller may further include a memory part configured to store the look-up table.

In an exemplary embodiment, the predetermined pattern may include a pattern generating a crosstalk when corresponding voltages are applied to the display panel and a pattern generating a power ripple when corresponding voltages are applied to the display panel.

In an exemplary embodiment, the display apparatus may further include a backlight assembly configured to provide light to the display panel. The driving voltage may include a first driving voltage to drive the driving part and a second driving voltage to drive the backlight assembly.

In an exemplary embodiment, the display apparatus may further include a timing controller configured to receive the input image data and an input control signal from an external apparatus, to generate a control signal based on the input image data and the input control signal, and to output the control signal to the driving part. The image pattern detector may be disposed in the timing controller.

According to one or more exemplary embodiment, an output voltage of the converter may be controlled in accordance with a pattern of an input image data, a change of a temperature, and a change of a current, in real time. Thus, the display quality of the display apparatus may be improved.

BRIEF DESCRIPTION OF THE DRAWINGS

The above and other features and advantages of the inventive concept will become more apparent by description of detailed exemplary embodiments thereof with reference to the accompanying drawings, in which.

DETAILED DESCRIPTION

Hereinafter, embodiments of the inventive concept will be explained in detail with reference to the accompanying drawings.

Figure 1:
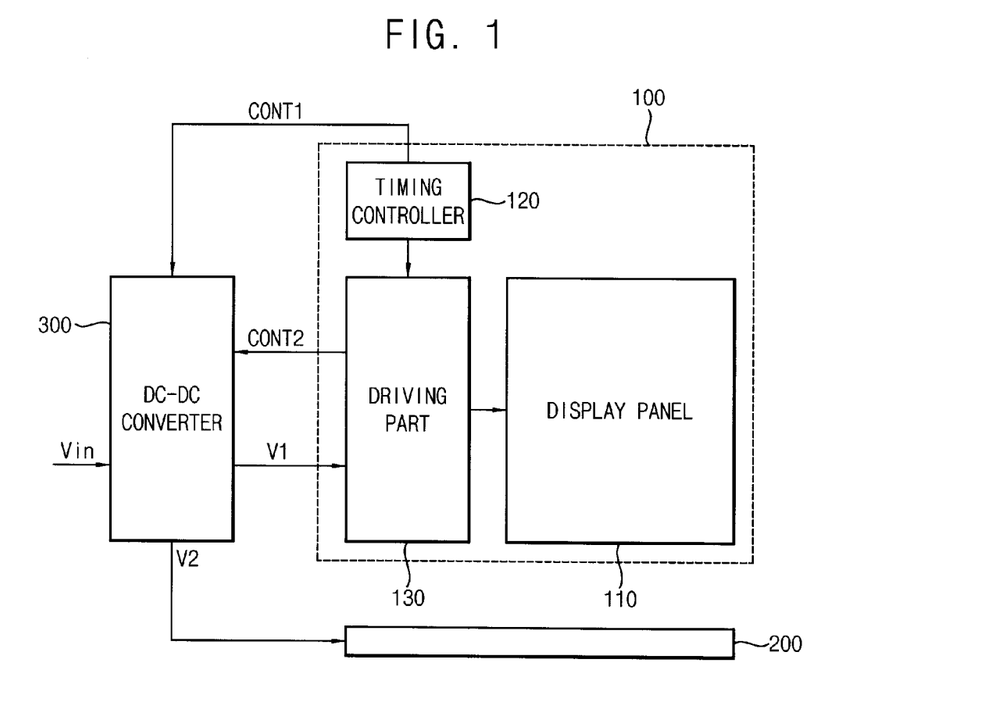
FIG. 1 is a block diagram illustrating a display apparatus according to an exemplary embodiment of the inventive concept.
Figure 2:
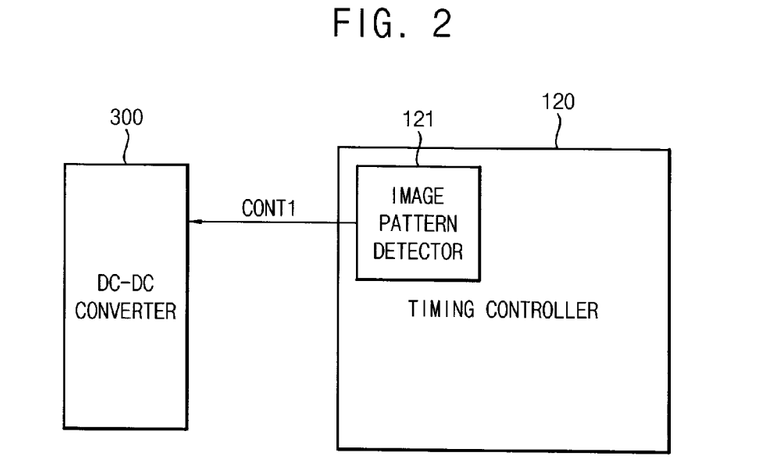
FIG. 2 is a block diagram illustrating an image pattern detector and a DC-DC converter of FIG. 1.
Figure 3A:
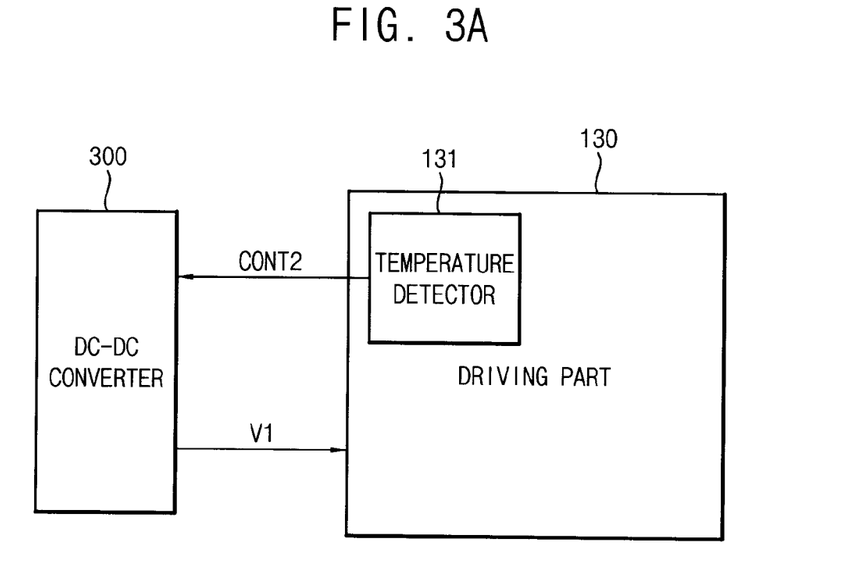
FIG. 3A is a block diagram illustrating a temperature detector and a DC-DC converter according to an exemplary embodiment of the inventive concept of FIG. 1.
Figure 3B:
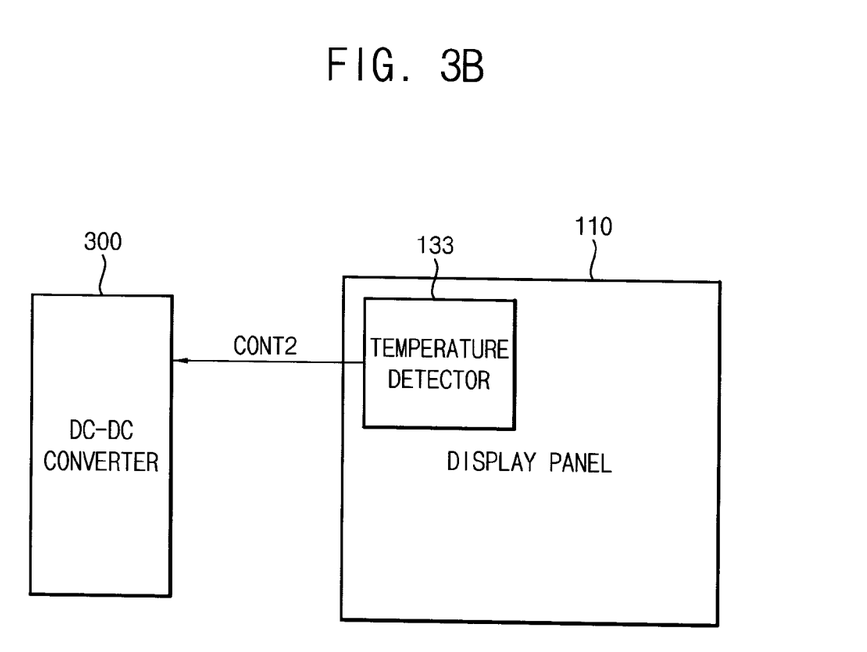
FIG. 3B is a block diagram illustrating a temperature detector and a DC-DC converter according to an exemplary embodiment of the inventive concept.

FIG. 1 is a block diagram illustrating a display apparatus according to an exemplary embodiment of the inventive concept. FIG. 2 is a block diagram illustrating an image pattern detector and a DC-DC converter of FIG. 1. FIG. 3A is a block diagram illustrating a temperature detector and a DC-DC converter according to an exemplary embodiment of the inventive concept of FIG. 1. FIG. 3B is a block diagram illustrating a temperature detector and a DC-DC converter according to an exemplary embodiment of the inventive concept.

Referring to FIGS. 1 to 3B, the display apparatus includes a display panel module 100, a backlight assembly 200 and a voltage generator.

The display panel module 100 may display an image. The display panel module 100 may include a display panel 110, a timing controller 120 and a driving part 130.

The display panel 110 may include a first substrate, a second substrate and a liquid crystal layer.

The driving part 130 may include a gate driver and a data driver.

The first substrate may be a thin film transistor ("TFT") array substrate including a plurality of TFTs. The second substrate faces the first substrate. The second substrate may be a color filter substrate including a color filter. The liquid crystal layer is disposed between the first substrate and the second substrate.

The timing controller 120 receives input image data and an input control signal from an external apparatus. The input image data may include image data of various colors, such as red image data, green image data and blue image data. The input control signal may include a master clock signal, a data enable signal, a vertical synchronizing signal and a horizontal synchronizing signal.

The timing controller 120 generates a first control signal, a second control signal and a data signal based on the input image data and the input control signal.

The timing controller 120 generates the first control signal to control a driving timing of the gate driver based on the input control signal, and outputs the first control signal to the gate driver. The first control signal may include a vertical start signal and a gate clock signal.

The timing controller 120 generates the second control signal to control a driving timing of the data driver based on the input control signal, and outputs the second control signal to the data driver. The second control signal may include a horizontal start signal and a load signal.

Referring to FIG. 2, the timing controller 120 may further include an image pattern detector 121.

The image pattern detector 121 may receive the input image data. The image pattern detector 121 may analyze the input image data and output a first compensation signal CONT1 to a DC-DC converter 300 of the voltage generator, based on a predetermined pattern occurring in the input image data. The predetermined pattern may include a pattern generating a crosstalk and a pattern generating a power ripple defect.

For example, when the display panel 110 operates based on a dot inversion scheme which inverts a phase of each pixel or each dot, and when a first image that includes one dot pattern is displayed on the display panel 110, a flicker and/or the power ripple defect may be generated on the display panel 110. For another example, when a second image that includes a background having a middle grayscale and an object having a relatively dark grayscale is displayed on the display panel 110, the crosstalk may be generated on the display panel 110. For still another example, when the display panel 110 operates based on a column inversion scheme which inverts phases of pixels in each data line, and when a third image having grayscales of which changes in each pixel in the same column is displayed on the display panel 110, the flicker and/or the power ripple defect may be generated on the display panel 110. In other words, the first, second and third images may include examples of the predetermined pattern, e.g., the pattern generating the crosstalk and/or the pattern generating the power ripple defect, respectively.

The driving part 130 may include the gate driver and the data driver. The data driver and the gate driver may be connected to the first substrate to output a driving signal to the first substrate. For example, the gate driver may output a gate signal to a gate line of the first substrate. The data driver may output a data voltage to a data line of the first substrate. The gate and data drivers may include a flexible printed circuit board ("FPC"), a driving chip mounted on the FPC and a printed circuit board ("PCB") connected to a first end of the FPC.

Referring to FIG. 3A, the driving part 130 may further include a temperature detector 131.

The temperature detector 131 may detect a temperature of the driving part 130 and output a second compensation signal CONT2 to the DC-DC converter, based on the temperature of the driving part 130.

The temperature detector 131 may include one of a negative temperature coefficient ("NTC") thermistor, a positive temperature coefficient ("PTC") thermistor and a critical temperature resistor ("CTR"). A resistance of the negative temperature coefficient ("NTC") thermistor decreases when the ambient temperature increases. A resistance of the positive temperature coefficient ("PTC") thermistor increases when the ambient temperature increases. A resistance of the critical temperature resistor ("CTR") changes suddenly at a preset temperature.

Alternatively, the temperature detector 131 may include a Seebeck element or a Peltier element. The Seebeck element uses a Seebeck effect which generates an electromotive force by a difference of temperature. The Peltier element uses a Peltier effect which generates a heat adsorption (or a heat generation) by a current. Any form of temperature detection is contemplated for temperature detector 131.

The temperature of the driving part 130 may be a temperature of the gate driver. Alternatively, the temperature of the driving pan 130 may be a temperature of the data driver.

Referring to FIG. 3B, the temperature detector 133 may be disposed in the display panel 110. When the temperature detector 133 is disposed in the display panel 110, the temperature detector 133 may detect a temperature of the display panel 110, and output the second compensation signal CONT2 to the DC-DC converter, based on the temperature of the display panel 110.

For example, the temperature detector 133 may detect a temperature of the first substrate.

The backlight assembly 200 may include a light adjusting part and a light source apparatus.

The light adjusting part may include a protecting sheet, a prism sheet and a diffusion sheet.

The protecting sheet protects the prism sheet from scratches. The prism sheet may include a plurality of prisms disposed with a uniform gap (i.e., spaced apart in roughly equal intervals) on an upper surface. Each of the prisms may have a triangular shape in a cross-sectional view, or any other suitable cross-sectional shape. The prism sheet condenses a light diffused by the diffusion sheet in a direction substantially perpendicular to the display panel module 100. The diffusion sheet diffuses a light provided from a light source part so that luminance uniformity may be improved.

The light source apparatus includes a light source part and a light source driver. The light source part may include a plurality of light sources. For example, the light source part may include a plurality of light emitting diodes ("LEDs"). Alternatively, the light source part may include a plurality of cold cathode fluorescent lamps ("CCFL").

The light source driver is connected to the light source part. The light source driver provides a driving voltage and/or a driving current to the light source part. The light source driver may be disposed outside of a light sources receiving container. For example, the light source driver may be disposed facing a rear surface of a bottom plate of the receiving container.

The voltage generator includes an AC-DC rectifier and the DC-DC converter 300.

The AC-DC rectifier receives an input alternating current voltage. The AC-DC rectifier generates an input direct current voltage Vin by rectifying the input alternating current voltage. The AC-DC rectifier outputs the input direct current voltage Vin to the DC-DC converter 300.

The DC-DC converter 300 generates a first driving voltage V1 to drive the driving part 130, and a second driving voltage V2 to drive the backlight assembly 200. The first driving voltage V1 is an output of a voltage generator, so that the first driving voltage V1 may be referred to as a first output voltage V1. The second driving voltage V2 is also an output of a voltage generator, so that the second driving voltage V2 may be referred to as a second output voltage V2. The DC-DC converter 300 may be a boost converter.

A structure and an operation of the DC-DC converter 300 are explained in further detail with reference to FIG. 4.

Figure 4:
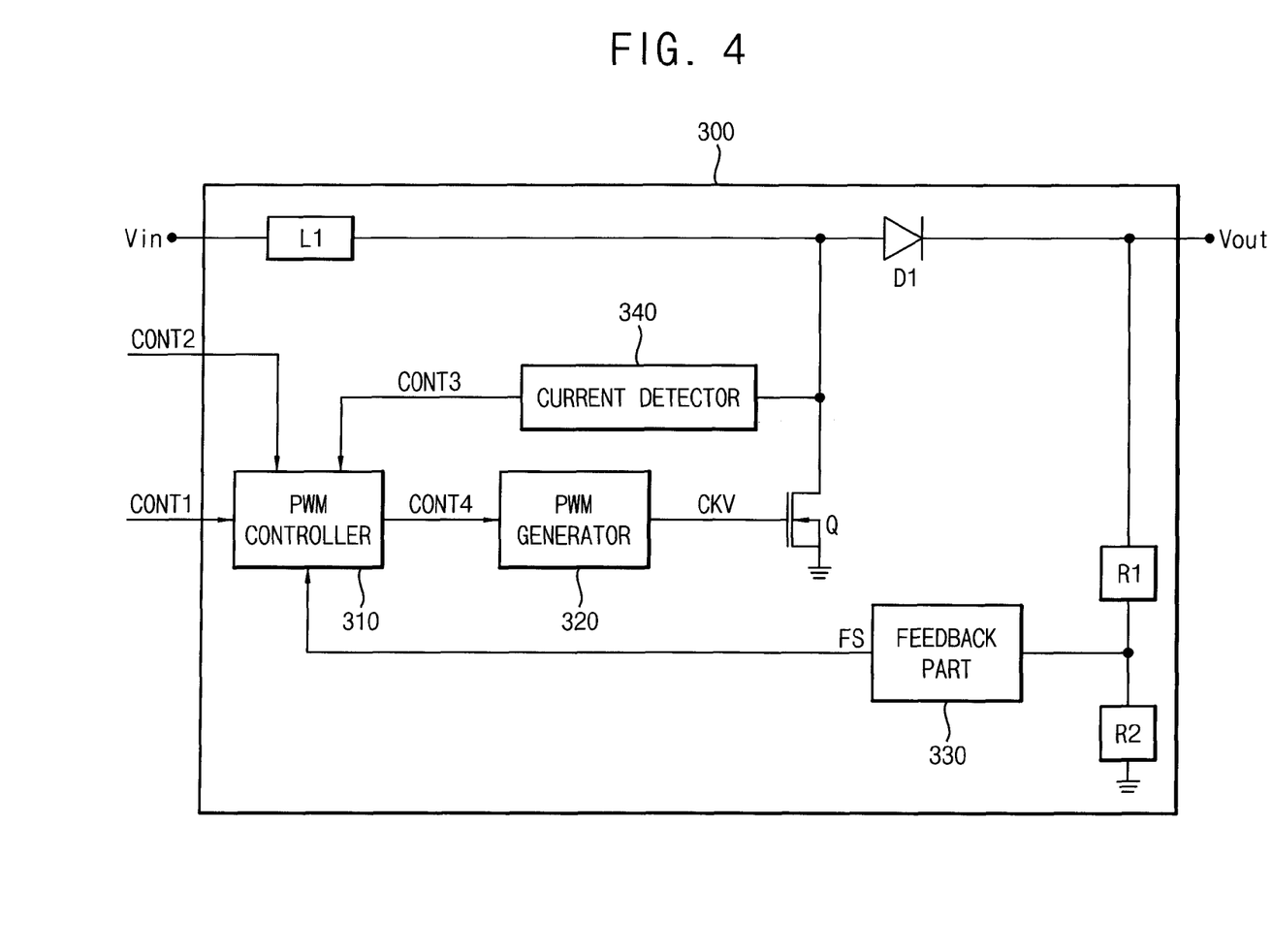
FIG. 4 is a block diagram illustrating a DC-DC converter in FIG. 1.

FIG. 4 is a block diagram illustrating a DC-DC converter in FIG. 1.

Referring FIGS. 1 to 4, the DC-DC converter 300 may include an inductor L1, a diode D1, a switching element Q, a first resistor R1, a second resistor R2, a PWM controller 310, a PWM generator 320 and a feedback part 330. The DC-DC converter 300 may further include an input terminal which receives the input direct current voltage Vin, and an output terminal which outputs an output voltage Vout.

The inductor L1 may be connected to the input terminal. A first end of the inductor L1 may receive the input direct current voltage Vin. A second end of the inductor L1 may be connected to an anode of the diode D1 and a drain electrode of the switching element Q.

A cathode of the diode D1 may be connected to an output terminal of the DC-DC converter 300 and a first end of the first resistor R1.

A gate electrode of the switching element Q may be connected to an output terminal of the PWM generator 320. A source electrode of the switching element Q may be connected to ground.

A second end of the first resistor R1 may be connected to a first end of the second resistor R2 and the feedback part 330.

A second end of the second resistor R2 may be connected to ground.

An output terminal of the feedback part 330 may be connected to the PWM controller 310. The feedback part 330 may generate a feedback signal FS based on a voltage applied between the first resistor R1 and the second resistor R2, and output the feedback signal FS to the PWM controller 310. The feedback signal FS may be a signal for controlling the output voltage Vout.

The output voltage Vout may be the first driving voltage V1 which drives the driving part 130. Alternatively, the output voltage Vout may be the second driving voltage V2 which drives the backlight assembly 200.

The DC-DC converter 300 may further include a current detector 340. The current detector 340 may be connected to the drain electrode of the switching element Q. The current detector 340 may detect a current applied to the drain electrode of the switching element Q, and output a third compensation signal CONT3 to the PWM controller 310. The current detector 340 may generate the third compensation signal CONT3 based on the current applied to the drain electrode of the switching element Q. The third compensation signal CONT3 may be a signal for controlling the output voltage Vout.

The PWM controller 310 may generate a PWM control signal CONT4 based on the feedback signal FS, the first compensation signal CONT1, the second compensation signal CONT2 and the third compensation signal CONT3. The PWM controller 310 may generate the PWM control signal CONT4 in order to control the PWM generator 320. The PWM controller 310 may output the PWM control signal CONT4 to the PWM generator 320.

The PWM control signal CONT4 may include a signal for controlling any one or more of a width, a period, a frequency, a slew rate and a duty ratio of a clock signal CKV. The clock signal CKV may be output from the PWM generator 320.

For example, the PWM controller 310 may generate the PWM control signal CONT4 in accordance with a look-up table corresponding to the feedback signal FS, the first compensation signal CONT1, the second compensation signal CONT2 and the third compensation signal CONT3. The PWM controller 310 may further include a memory part storing the look-up table.

A first end of the PWM generator 320 may be connected to the PWM controller 310. The PWM generator 320 may receive the PWM control signal CONT4 from the PWM controller 310. A second end of the PWM generator 320 may be connected to the gate electrode of the switching element Q. The PWM generator 320 may generate the clock signal CKV based on the PWM control signal CONT4. The PWM generator 320 may output the clock signal CKV to the gate electrode of the switching element Q. The clock signal CKV may control a level of the output voltage Vout by controlling a turn on time of the switching element Q.

In some exemplary embodiments, when one of the first, second and third images including the predetermined pattern is displayed on the display panel 110, the image pattern detector 121 may activate the first compensation signal CONTE When the first compensation signal CONT1 is activated, the PWM controller 310 may set a first control signal included in the PWM control signal CONT4 as a first value. The PWM generator 320 may increase the slew rate of the clock signal CKV based on the first control signal having the first value. Therefore, the flicker, the power ripple defect and/or the crosstalk on the display panel 110 may be eliminated.

In other exemplary embodiments, when the temperature of the driving part 130 increases, the temperature detector 131 may generate the second compensation signal CONT2 having a third value. The PWM controller 310 may set the first control signal as a second value and/or may set a second control signal included in the PWM control signal CONT4 as the second value, based on the second compensation signal CONT2 having the third value. The PWM generator 320 may decrease the slew rate of the clock signal CKV based on the first control signal having the second value and/or may decrease the frequency of the clock signal CKV based on the second control signal having the second value. Therefore, the temperature of the driving part 130 may decrease.

When the temperature of the driving part 130 decreases, the temperature detector 131 may generate the second compensation signal CONT2 having a fourth value. The PWM controller 310 may set the first control signal as the first value and/or may set the second control signal as the first value, based on the second compensation signal CONT2 having the fourth value. The PWM generator 320 may increase the slew rate of the clock signal CKV based on the first control signal having the first value and/or may increase the frequency of the clock signal CKV based on the second control signal having the first value. Therefore, the temperature of the driving part 130 may increase.

In still other exemplary embodiments, when the current increases, the current detector 340 may generate the third compensation signal CONT3 having the third value. The PWM controller 310 may set the first control signal as the first value and/or may set the second control signal as the first value, based on the third compensation signal CONT3 having the third value. The PWM generator 320 may increase the slew rate of the clock signal CKV based on the first control signal having the first value and/or may increase the frequency of the clock signal CKV based on the second control signal having the first value. Therefore, the current may decrease.

When the current decreases, the current detector 340 may generate the third compensation signal CONT3 having the fourth value. The PWM controller 310 may set the first control signal as the second value and/or may set the second control signal as the second value, based on the third compensation signal CONT3 having the fourth value. The PWM generator 320 may decrease the slew rate of the clock signal CKV based on the first control signal having the second value and/or may decrease the frequency of the clock signal CKV based on the second control signal having the second value. Therefore, the current may increase.

In still other exemplary embodiments, when the output voltage Vout increases, the feedback part 330 may generate the feedback signal FS having the third value. The PWM controller 310 may set a third control signal included in the PWM control signal CONT4 as the second value based on the feedback signal FS having the third value. The PWM generator 320 may decrease the duty ratio of the clock signal CKV based on the third control signal having the second value. Therefore, the output voltage Vout may decrease.

When the output voltage Vout decreases, the feedback part 330 may generate the feedback signal FS having the fourth value. The PWM controller 310 may set the third control signal as the first value based on the feedback signal FS having the fourth value. The PWM generator 320 may increase the duty ratio of the clock signal CKV based on the third control signal having the first value. Therefore, the output voltage Vout may increase.

According to one or more of the illustrated exemplary embodiments, the image pattern detector 121 may analyze the input image data and detect a pattern which generates a noise when an image is displayed. The image pattern detector 121 may output the first compensation signal CONT1 based on the pattern. The image pattern detector 121 may output the first compensation signal CONT1 to the PWM controller 310 of the DC-DC converter 300. The temperature detector may detect the temperature of the driving part 130 and/or the display panel 110. The temperature detector may output the second compensation signal CONT2 based on the temperature of the driving part 130 and/or the display panel 110. The temperature detector may output the second compensation signal CONT2 to the PWM controller 310. The current detector 340 may detect the current applied to the drain electrode of the switching element Q, and output the third compensation signal CONT3 based on the current applied to the drain electrode. The current detector 340 may output the third compensation signal CONT3 to the PWM controller 310.

The PWM controller 310 may output the PWM control signal CONT4 to generate an optimal output voltage of the DC-DC converter 300. The PWM controller 310 may output the PWM control signal CONT4 based on feedback signal FS, the first compensation signal CONT1, the second compensation signal CONT2 and the third compensation signal CONT3. The PWM controller 310 may output the PWM control signal CONT4 to the PWM generator 320. Thus, the PWM generator 320 may control the output voltage of the DC-DC converter 300 in accordance with the pattern of the input image data, the temperature of the driving part 130, the temperature of the display panel 110 and the current of the switching element Q, in real time. In addition, the display quality of a display apparatus may be improved.

A DC-DC converter of the illustrated exemplary embodiments may be applied to a mobile type display apparatus such as a mobile phone, a note book computer and a tablet computer, a fixed type display such as a television and a desktop display, and a display of a general appliance such as a refrigerator, a washing machine and an air conditioner.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The various features of the above described examples and embodiments can be mixed and matched in any manner to produce further embodiments consistent with the invention. The inventive concept is defined by the following claims, with equivalents of the claims to be included therein.

What is claimed is:

1. A converter comprising:
    a feedback part configured to output a feedback signal based on a driving voltage;
    a pulse width modulation (PWM) controller configured to output a PWM control signal based on the feedback signal and a first compensation signal, the first compensation signal determined according to an occurrence of a predetermined pattern of an input image data; and
    a PWM generator configured to control the driving voltage based on the PWM control signal.

2. The converter of claim 1, wherein the PWM controller is configured to output the PWM control signal based on the feedback signal, the first compensation signal and a second compensation signal, and
    the second compensation signal is determined according to a temperature of a driving part.

3. The converter of claim 1, wherein the PWM controller is configured to output the PWM control signal based on the feedback signal, the first compensation signal and a second compensation signal, and
    the second compensation signal is determined according to a temperature of a display panel.

4. The converter of claim 1, further comprising an input terminal, an output terminal, an inductor, a switching element and a diode, wherein
the input terminal is configured to receive an input voltage,
the output terminal is configured to output the driving voltage,
a first end of the inductor is electrically connected to the input terminal and the inductor is configured to charge the input voltage,
a gate electrode of the switching element is connected to the PWM generator, a source electrode of the switching element is connected to a ground, and a drain electrode of the switching element is connected to a second end of the inductor, and
an anode of the diode is connected to the second end of the inductor and the drain electrode of the switching element, and a cathode of the diode is connected to the output terminal.

5. The converter of claim 4, further comprising a first resistor connected to the output terminal and a second resistor connected to the first resistor in series,
wherein the feedback part is configured to output the feedback signal based on a voltage applied between the first resistor and the second resistor.

6. The converter of claim 4, further comprising a current detector connected to the drain electrode of the switching element,
wherein the current detector is configured to detect a current applied to the drain electrode of the switching element, and to output a third compensation signal based on the current applied to the drain electrode, and
the PWM controller is configured to output the PWM control signal based on the feedback signal, the first compensation signal and the third compensation signal.

7. A display apparatus comprising:
a display panel configured to display an image;
a driving part configured to drive the display panel;
an image pattern detector configured to output a first compensation signal based on an input image data; and
a converter configured to output a driving voltage to the driving part, and comprising:
a feedback part configured to output a feedback signal based on the driving voltage;
a pulse width modulation (PWM) controller configured to output a PWM control signal based on the feedback signal and the first compensation signal, the first compensation signal determined according to an occurrence of a predetermined pattern of the input image data; and
a PWM generator configured to control the driving voltage based on the PWM control signal.

8. The display apparatus of claim 7, further comprising a temperature detector configured to output a second compensation signal based on a temperature of the driving part, and
wherein the PWM controller is configured to output the PWM control signal based on the feedback signal, the first compensation signal and the second compensation signal.

9. The display apparatus of claim 8, wherein the driving part comprises a gate driver configured to output a gate signal to a gate line of the display panel, and
the temperature detector is configured to output the second compensation signal based on a temperature of the gate driver.

10. The display apparatus of claim 8, wherein the driving part comprises a data driver configured to output a data voltage to a data line of the display panel, and
the temperature detector is configured to output the second compensation signal based on a temperature of the data driver.

11. The display apparatus of claim 8, wherein the temperature detector comprises one of a negative temperature coefficient ("NTC") thermistor, a positive temperature coefficient ("PTC") thermistor, a critical temperature resistor ("CTR") and a Seebeck element, and
a resistance of the negative temperature coefficient ("NTC") thermistor decreases when the ambient temperature increases,
a resistance of the positive temperature coefficient ("PTC") thermistor increases when the ambient temperature increases,
a resistance of the critical temperature resistor ("CTR") significantly changes at approximately a preset temperature, and
the Seebeck element generates an electromotive force according to a temperature difference.

12. The display apparatus of claim 7, further comprising a temperature detector configured to output a second compensation signal based on a temperature of the display panel, and
wherein the PWM controller is configured to output the PWM control signal based on the feedback signal, the first compensation signal and the second compensation signal.

13. The display apparatus of claim 7, wherein the converter further comprises an input terminal, an output terminal, an inductor, a switching element and a diode, wherein
the input terminal is configured to receive an input voltage,
the output terminal is configured to output the driving voltage,
a first end of the inductor is electrically connected to the input terminal and the inductor is configured to charge the input voltage,
a gate electrode of the switching element is connected to the PWM generator, a source electrode of the switching element is connected to a ground, and a drain electrode of the switching element is connected to a second end of the inductor, and
an anode of the diode is connected to the second end of the inductor and the drain electrode of the switching element, and a cathode of the diode is connected to the output terminal.

14. The display apparatus of claim 13, wherein the converter further comprises a current detector connected to the drain electrode of the switching element,
the current detector is configured to detect a current applied to the drain electrode of the switching element, and to output a third compensation signal based on the current applied to the drain electrode, and
the PWM controller is configured to output the PWM control signal based on the feedback signal, the first compensation signal and the third compensation signal.

15. The display apparatus of claim 13, wherein the converter further comprises a first resistor connected to the output terminal and a second resistor connected to the first resistor in series, and
the feedback part is configured to output the feedback signal based on a voltage applied between the first resistor and the second resistor.

16. The display apparatus of claim 7, wherein the PWM controller comprises a look-up table having values corresponding to the PWM control signal, and
    the PWM controller is configured to generate the PWM control signal according to the stored values of the look-up table.

17. The display apparatus of claim 16, wherein the PWM controller further comprises a memory part configured to store the look-up table.

18. The display apparatus of claim 7, wherein the predetermined pattern comprises a pattern generating a crosstalk when corresponding voltages are applied to the display panel and a pattern generating a power ripple when corresponding voltages are applied to the display panel.

19. The display apparatus of claim 7, further comprising a backlight assembly configured to provide light to the display panel,
    wherein the driving voltage comprises a first driving voltage to drive the driving part and a second driving voltage to drive the backlight assembly.

20. The display apparatus of claim 7, further comprising a timing controller configured to receive the input image data and an input control signal from an external apparatus, to generate a control signal based on the input image data and the input control signal, and to output the control signal to the driving part,
    wherein the image pattern detector is disposed in the timing controller.

* * * * *